United States Patent
Niewiadomski et al.

(10) Patent No.: US 11,214,105 B2
(45) Date of Patent: Jan. 4, 2022

(54) SATURATED STEERING DETECTION AND OPERATION FOR GUIDED VEHICLE OPERATION

(71) Applicant: Ford Global Technologies, LLC, Dearborn, MI (US)

(72) Inventors: Luke Niewiadomski, Dearborn, MI (US); Kyle Simmons, New Boston, MI (US); Li Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 16/260,547

(22) Filed: Jan. 29, 2019

(65) Prior Publication Data
US 2020/0238772 A1 Jul. 30, 2020

(51) Int. Cl.
| | |
|---|---|
| B60D 1/36 | (2006.01) |
| B60D 1/06 | (2006.01) |
| B62D 13/06 | (2006.01) |
| B60R 11/04 | (2006.01) |
| G05D 1/02 | (2020.01) |
| B60W 60/00 | (2020.01) |
| B60W 10/20 | (2006.01) |
| B60W 10/04 | (2006.01) |

(52) U.S. Cl.
CPC ............ *B60D 1/366* (2013.01); *B60D 1/065* (2013.01); *B60R 11/04* (2013.01); *B60W 10/04* (2013.01); *B60W 10/20* (2013.01); *B60W 60/0025* (2020.02); *B62D 13/06* (2013.01); *G05D 1/021* (2013.01); *G05D 1/0246* (2013.01)

(58) Field of Classification Search
None
See application file for complete search history.

(56) References Cited

U.S. PATENT DOCUMENTS

| | | | |
|---|---|---|---|
| 7,739,015 B2 | 6/2010 | Senneff et al. | |
| 8,191,915 B2* | 6/2012 | Freese, V | B60D 1/58 280/477 |
| 9,102,271 B2 | 8/2015 | Trombley et al. | |
| 9,140,553 B2 | 9/2015 | Grimm et al. | |
| 9,696,723 B2* | 7/2017 | Zeng | G05D 1/0212 |
| 9,854,209 B2 | 12/2017 | Aich et al. | |
| 9,889,714 B2 | 2/2018 | Bochenek et al. | |
| 2012/0283909 A1* | 11/2012 | Dix | G05D 1/0278 701/41 |
| 2014/0012465 A1* | 1/2014 | Shank | B62D 15/0285 701/36 |

(Continued)

FOREIGN PATENT DOCUMENTS

EP 2682329 A1 1/2014

*Primary Examiner* — Dale W Hilgendorf
*Assistant Examiner* — Alexander C. Bost
(74) *Attorney, Agent, or Firm* — Raymond Coppiellie; Price Heneveld LLP (57) ABSTRACT

A method for controlling a vehicle comprises identifying a first detected position of a trailer coupler in the sensor data and identifying a trajectory range of a hitch of the vehicle based on a steering angle range of the vehicle. In response to the first detected position being outside the trajectory range, the method may continue by calculating a nearby position within the trajectory range based on the trajectory range. The method further comprises maneuvering the vehicle aligning the hitch with the nearby position.

20 Claims, 9 Drawing Sheets

(56) References Cited

U.S. PATENT DOCUMENTS

| | | | |
|---|---|---|---|
| 2014/0379217 A1* | 12/2014 | Rupp | B62D 15/027 |
| | | | 701/41 |
| 2015/0138340 A1* | 5/2015 | Lavoie | G06K 9/3216 |
| | | | 348/118 |
| 2015/0158527 A1* | 6/2015 | Hafner | B62D 15/027 |
| | | | 701/41 |
| 2015/0210317 A1* | 7/2015 | Hafner | B62D 15/0275 |
| | | | 701/41 |
| 2016/0052548 A1* | 2/2016 | Singh | B60D 1/36 |
| | | | 701/37 |
| 2016/0059889 A1* | 3/2016 | Herzog | B62D 15/027 |
| | | | 701/41 |
| 2016/0280267 A1* | 9/2016 | Lavoie | B62D 13/06 |
| 2016/0304122 A1* | 10/2016 | Herzog | B62D 15/0295 |
| 2017/0123431 A1* | 5/2017 | Ghneim | B60W 10/184 |
| 2017/0297620 A1* | 10/2017 | Lavoie | B62D 5/04 |
| 2017/0313351 A1* | 11/2017 | Lavoie | B62D 13/06 |
| 2018/0079406 A1* | 3/2018 | Izumi | B62D 15/022 |
| 2018/0121742 A1* | 5/2018 | Son | B62D 13/06 |
| 2018/0181142 A1* | 6/2018 | Baran | G01C 11/06 |
| 2018/0251153 A1* | 9/2018 | Li | B60D 1/06 |
| 2018/0304468 A1* | 10/2018 | Holz | G06T 7/13 |
| 2018/0312022 A1 | 11/2018 | Mattern et al. | |
| 2019/0339704 A1* | 11/2019 | Yu | B60R 1/003 |

\* cited by examiner

SATURATED STEERING DETECTION AND OPERATION FOR GUIDED VEHICLE OPERATION

FIELD OF THE DISCLOSURE

The present disclosure generally relates to a system for assisting in a vehicle-trailer hitching operation. In particular, the present disclosure relates to a system for guiding a vehicle to connect a trailer coupler.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a method for controlling a vehicle is disclosed. The method comprises identifying a first detected position of a trailer coupler in sensor data and identifying a trajectory range of a hitch of the vehicle based on a steering angle range of the vehicle. In response to the first detected position being outside the trajectory range, the method may continue by calculating a nearby position within the trajectory range based on the trajectory range. The method further comprises maneuvering the vehicle aligning the hitch with the nearby position.

Embodiments of the first aspect of the disclosure can include any one or a combination of the following features:
  maneuvering the vehicle to the first detected position in response to the first detected position being within the path range of the hitch;
  detecting a change in the first detected position of the coupler to a second detected position, wherein the second detected position is outside the trajectory range as a result of the change identified in the sensor data;
  wherein the change in the first detected position is detected based on a change in a vehicle position relative to the trailer coupler;
  wherein the change in the first detected position is detected in response to a variation in the sensor data;
  wherein the nearby location is calculated by identifying a minimum distance between an extent of the trajectory range of the hitch of the vehicle and the second detected location;
  identifying an alignment distance between the second detected position and the nearby position;
  comparing the alignment distance to an alignment threshold;
  wherein the maneuvering of the vehicle to the nearby position is controlled in response to the comparison of the alignment distance to the alignment threshold; and
  in response to the alignment distance being greater than the alignment threshold, identifying an unsuccessful alignment; and in response to the alignment distance being less than the alignment threshold, identifying a successful alignment.

According to another aspect of the present disclosure, a vehicle maneuvering system is disclosed. The system comprises a steering apparatus and a controller. The controller is configured to identify a first target of a trailer coupler in a sensor data and compare the first target to a trajectory range of a hitch of the vehicle. In response to the first target being outside the trajectory range, calculate a second target based on the trajectory range. The controller is further configured to control the steering apparatus to align the hitch with the second target.

Embodiments of some aspects of the disclosure can include any one or a combination of the following features:
  a sensor configured to capture the sensor data, wherein the sensor comprises at least one of an image sensor, an ultrasonic sensor, and a radar sensor;
  the trajectory range is based on a steering angle range of the steering apparatus;
  the controller is further configured to align the hitch with the second target by controlling a powertrain control system controlling a movement of the vehicle;
  the controller is further configured to, in response to the first target identified within the trajectory range, control the steering apparatus to align the hitch with the first target;
  the controller is further configured to detect a change in the first target, wherein the change results in a changed first target location outside the trajectory range as identified in the sensor data; and
  the second target is calculated by identifying a minimum distance between an extent of the trajectory range of the hitch of the vehicle and the changed first target location outside the trajectory range.

According to yet another aspect of the present disclosure, a vehicle system is disclosed. The system comprises a hitch mounted on a vehicle and a sensor apparatus configured to capture sensor data in a region proximate to the vehicle depicting a coupler of a trailer. The system further comprises a steering apparatus comprising a steering range and a controller. The controller is configured to identify a detected position of the coupler in the sensor data and compare the detected position to a trajectory range of the hitch based on the steering range. In response to the detected position being outside the trajectory range, the controller is configured to calculate an approximate alignment target based on the trajectory range. The controller is further configured to control the steering apparatus and a powertrain system of the vehicle to align the hitch with the approximate alignment target.

Embodiments of some aspects of the disclosure can include any one or a combination of the following features:
  the sensor apparatus comprises an imaging system including one or more cameras mounted on the vehicle, and the controller is further configured to identify the detected position based on image data received from the imaging system depicting the coupler; and the approximate alignment target is calculated by identifying a minimum distance between an extent of the trajectory range of the hitch of the vehicle and the detected position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
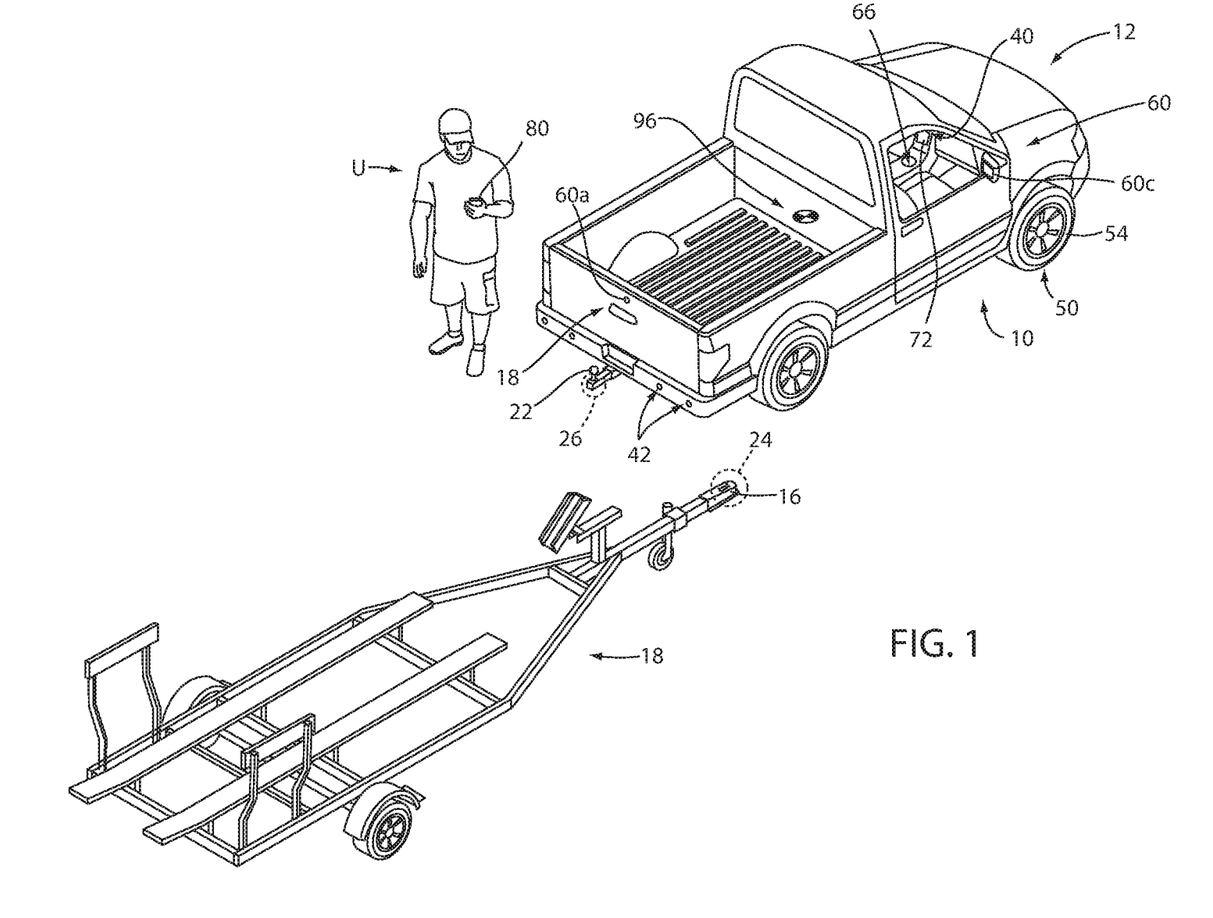
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-5, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In operation, the position data utilized to identify the position 24 of the coupler 16 may vary as the vehicle 12 is maneuvered toward the coupler 16. Such variation may lead to changes in a detected location of the coupler position 24. The changes in the coupler position 24 may further result in a navigational trajectory or trajectory range of the vehicle 12 in a reverse direction being insufficient to align the hitch position 26 with the coupler position 24. As further discussed in reference to FIGS. 5-8, the system 10 may be configured to adjust the vehicle path 20 such that the hitch ball 22 is aligned with a location proximate to the coupler 16 that is within the trajectory range of the vehicle 12. Additionally, in some embodiments, the controller 14 of the system may be configured to identify whether the adjusted target position of the hitch ball 22 and the corresponding hitch position 26 within the trajectory range of the vehicle 12 is within an alignment distance threshold. In this way, the system 10 may be configured to provide robust operation accounting for variations in the identification of the coupler position 24.

Figure 2:
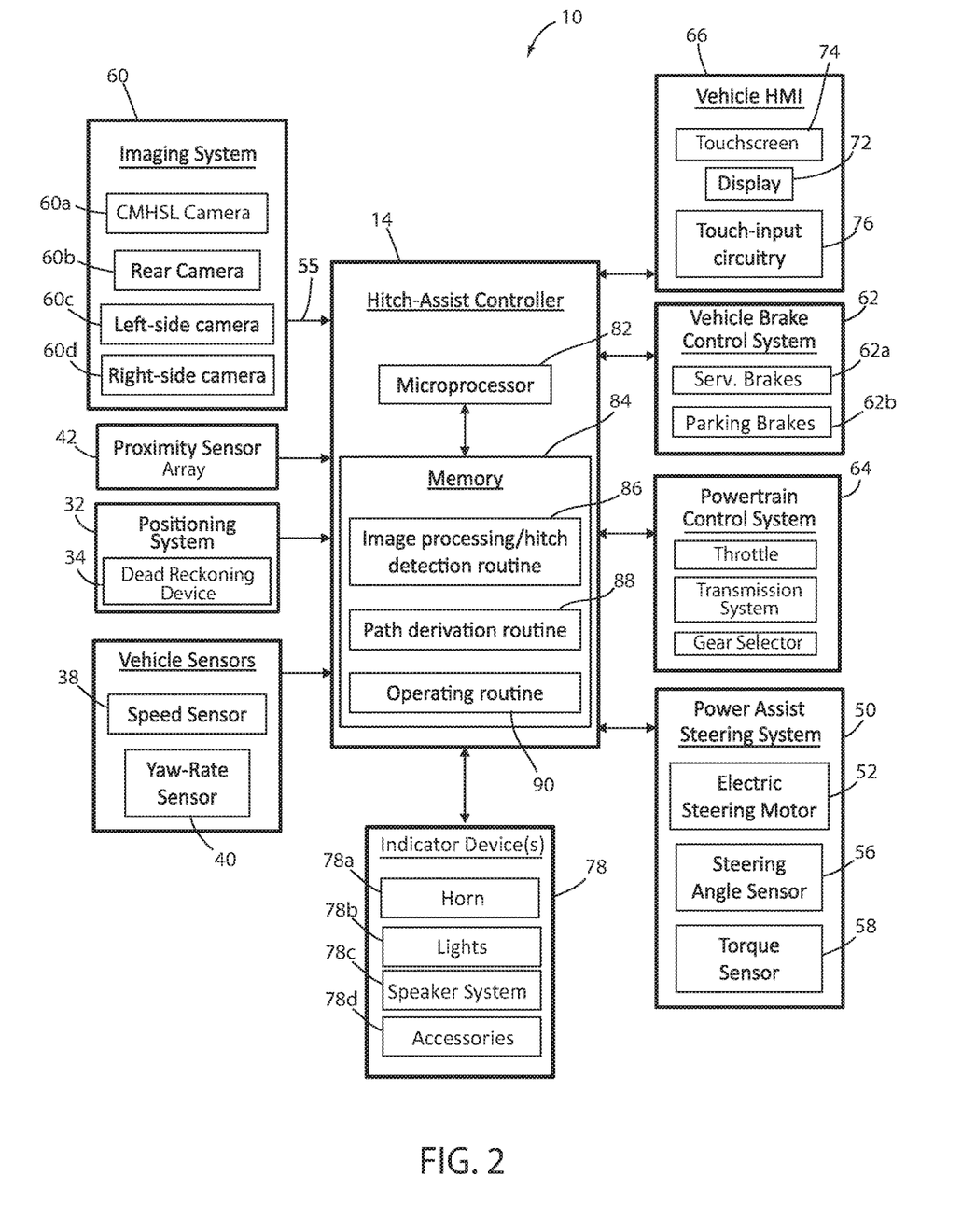
FIG. 2 is a diagram of a system according to an aspect of the disclosure for assisting in aligning the vehicle with a trailer in a position for hitching the trailer to the vehicle.
Figure 3:
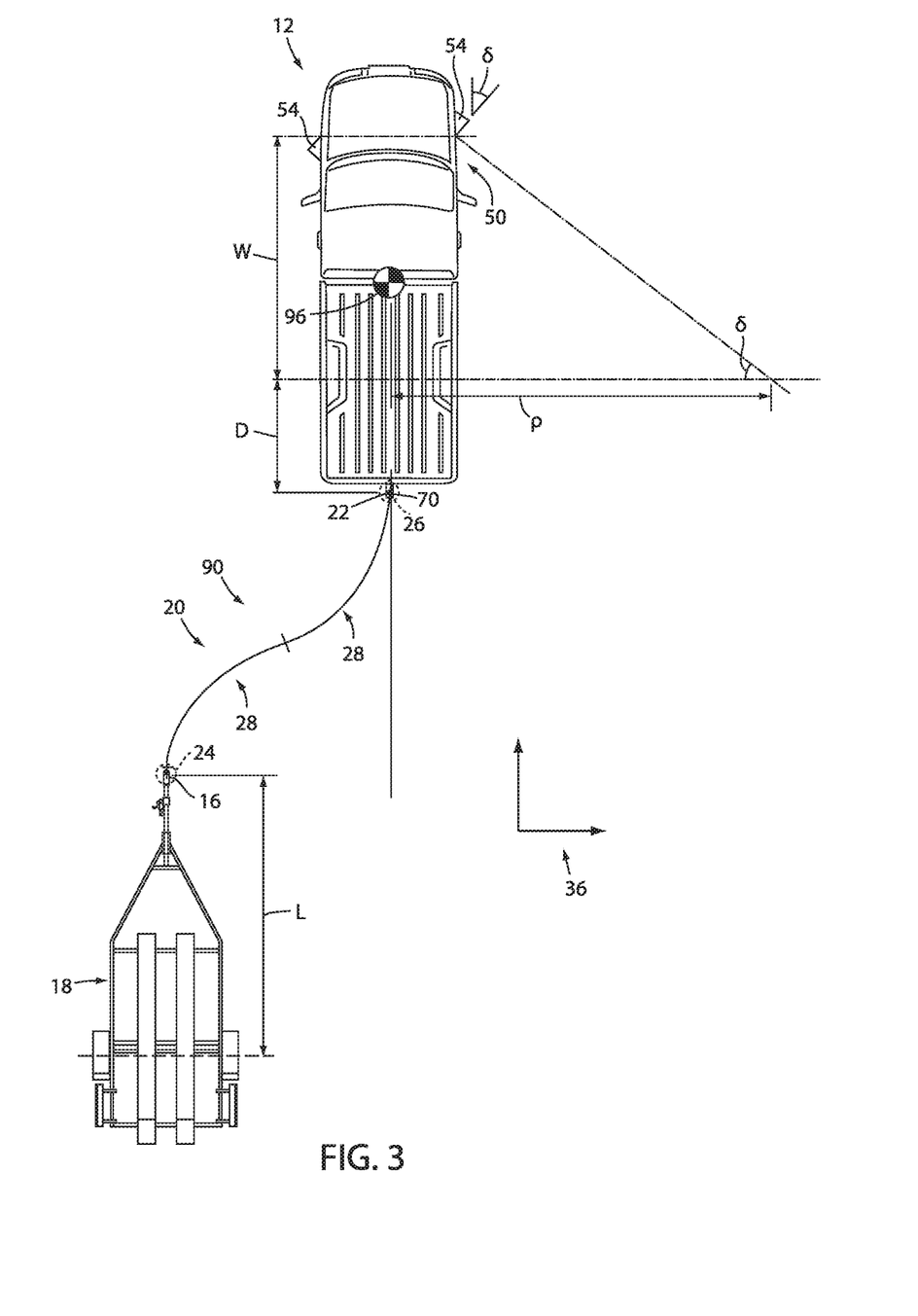
FIG. 3 is a plan view of a vehicle during a step of the alignment sequence with the trailer.
Figure 4:
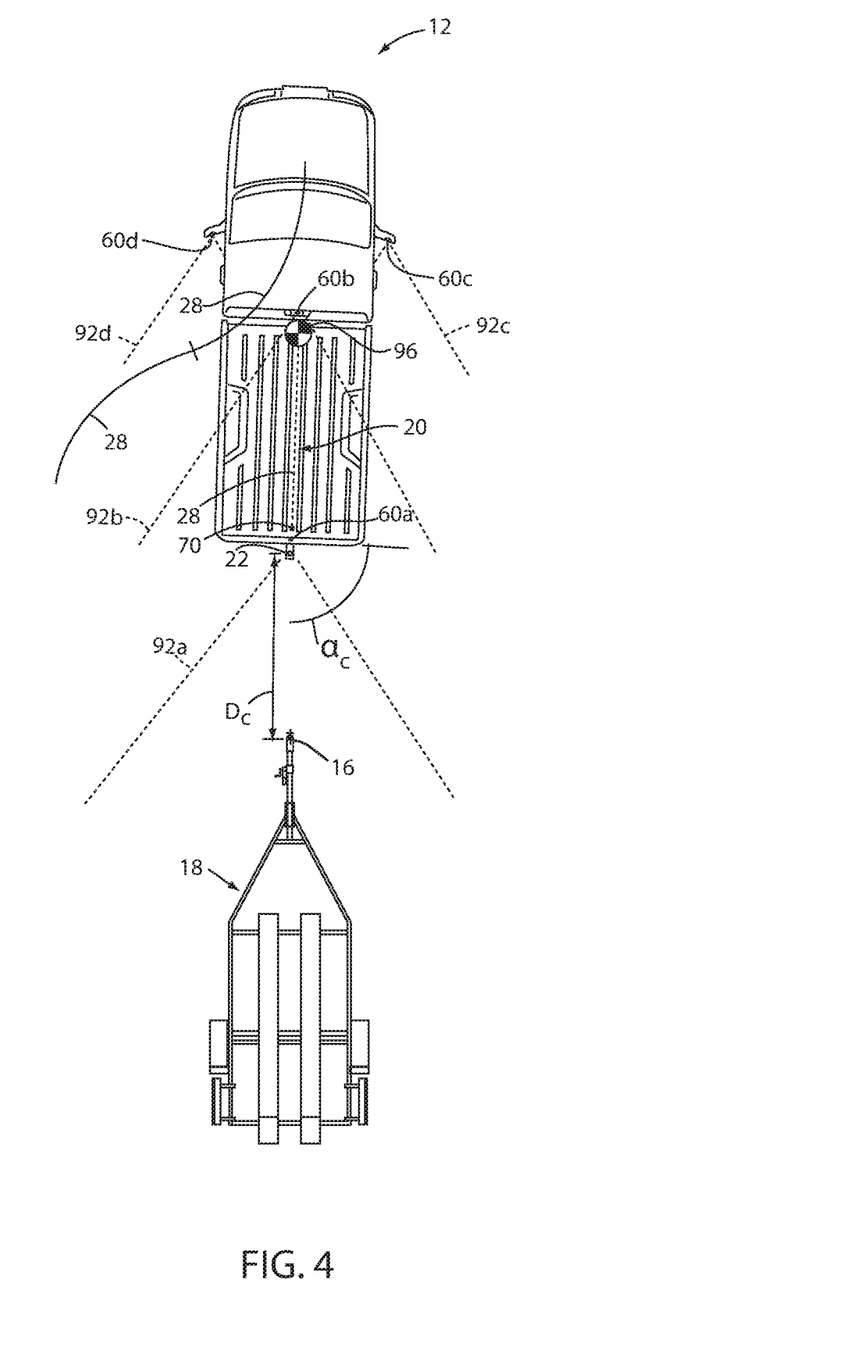
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. As mentioned above, regulation of the speed of the vehicle 12 may be advantageous to prevent collision with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in co pending, commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$, of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta} \quad (1)$$

in which the wheelbase W is fixed and the steering angle $\delta$ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Figure 5A:
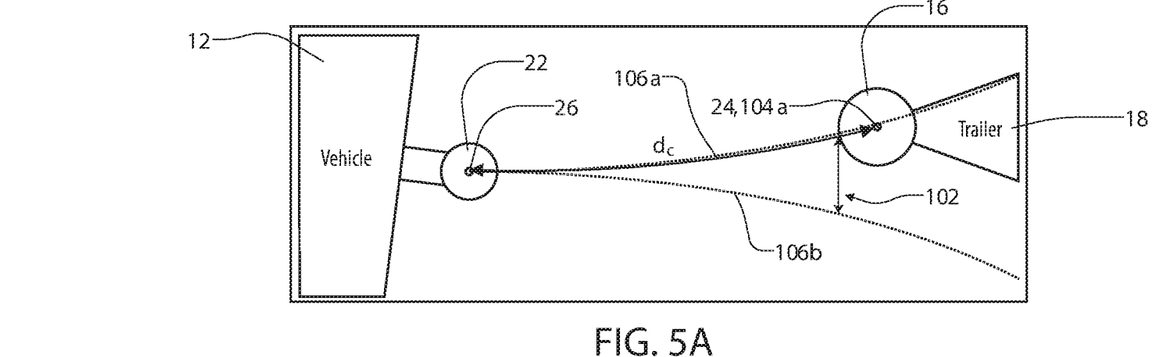
FIG. 5A is a diagram of a hitch ball of a vehicle approaching a coupler of a trailer demonstrating a trajectory range of the vehicle.
Figure 5B:
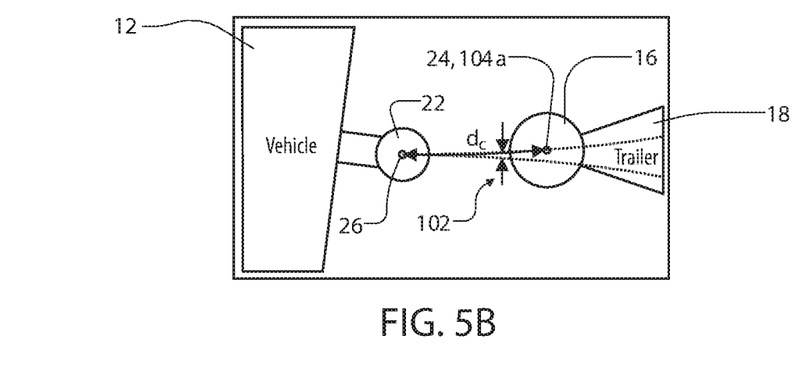
FIG. 5B is a diagram of a hitch ball of a vehicle approaching a coupler of a trailer demonstrating a trajectory range of the vehicle.

Referring now to FIGS. 5A and 5B, detailed diagrams of the hitch ball 22 and the coupler 16 are shown demonstrating a trajectory range 102 of the hitch ball 22. As shown in vehicle 12, the range and associated travel of the trajectory range 102 decreases as the distance $D_c$ to coupler 16 decreases. Accordingly, the system 10 may be increasing susceptible to errors in alignment between the hitch ball 22 and the coupler 16 as the distance $D_c$ to coupler 16 decreases. For example, the system 10 may provide for a greater trajectory range 102 and adjust to correct for more variation in a detected location of the coupler position 24 when the coupler position is further away from the vehicle 12. Accordingly, as further discussed in reference to FIGS. 6-9, the system 10 may be configured to adjust a target position of the hitch ball 22 from a first detected location 104a corresponding to the location of the coupler position 24 to a second detected location 104b, which may be near the coupler position 24 and within the trajectory range 102 (shown in FIG. 6B). In this way, the system 10 may provide for adjustments in order to prevent alignment failures resulting from signal noise and/or fluctuations in the coupler position 24 throughout an alignment operation.

As discussed in reference to the capability of the system 10 to maneuver the vehicle 12 and the hitch ball 22 over the trajectory range 102, the operation of the controller 14 may only be discussed in reference to movement in a reverse direction in a single pass without correction or adjustment in a forward direction. Though various embodiments of the system 10 may provide for autonomous and/or semi-autonomous maneuvering of the vehicle 12 in the forward and/or reverse directions, the operation of the system 10 may be more efficient and comfortable for one or more operators and/or passengers of the vehicle 12 if the movement is controlled in a steady rearward path without significant changes in the direction or acceleration of the vehicle 12. Abrupt changes in rate and/or direction may cause users to be uneasy and less likely to trust the operation of the system 10. Additionally, the capability of the system 10 to control the alignment of the hitch ball 22 with the coupler 16 by controlling motion in only the reverse direction may provide for the control routine and alignment of the vehicle 12 with the trailer 18 for vehicles that are only capable of assisted or semi-autonomous operation in the reverse direction. In this way, the disclosure may provide for a flexible solution that may be implemented in various configurations to provide the beneficial operations discussed herein.

In general, the trajectory range 102 of the vehicle 12 may be based on the dimensions and operating ranges (e.g. maximum steering angle $\delta_{max}$) of the vehicle 12. As shown in FIGS. 5A and 5B, the trajectory range 102 may extend over the range of the steering angle $\delta$ from a first steering extent 106a to a second steering extent 106b. As previously discussed in reference to equations 1 and 2 in reference to FIGS. 3-4, the minimum turning radius $\rho_{min}$ of the vehicle 12 may define the trajectory range 102 of the vehicle 12 in both lateral directions relative to the reverse motion of the vehicle 12. That is, based on the maximum steering angle $\delta_{max}$, the controller 14 of the system may identify the trajectory range 102 in which the vehicle 12 may be operable to align the hitch ball 22 with the coupler 16. Based on this trajectory range 102, the controller 14 may also determine whether the target position of the hitch ball position 26 must be adjusted to continue the alignment routine without error resulting in an error due to the position 24 of the coupler 16 being outside the trajectory range 102.

Figure 6A:
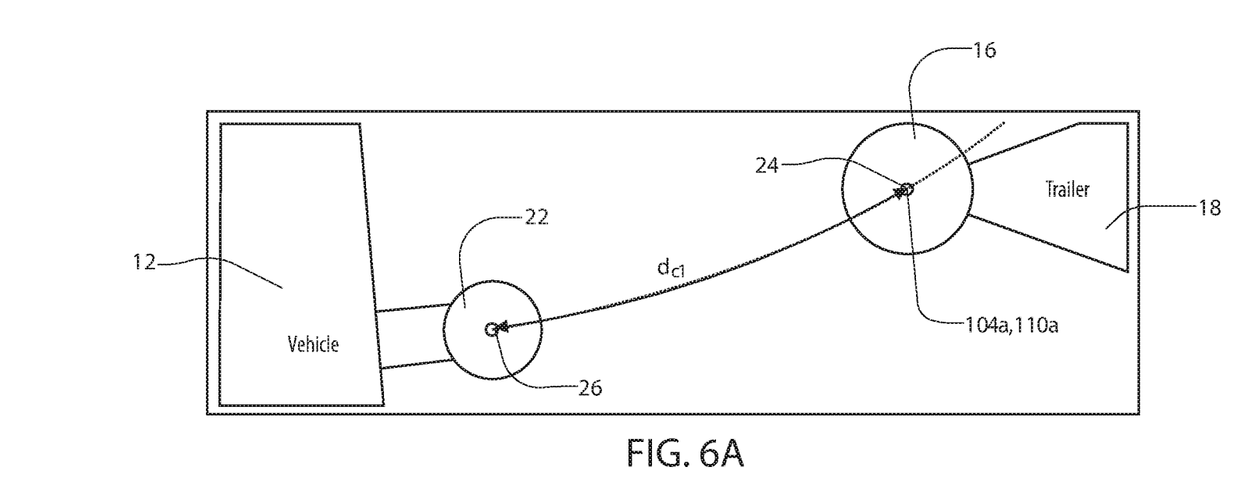
FIG. 6A is a diagram of a hitch ball of a vehicle approaching a coupler of a trailer demonstrating a first detected position of the coupler.
Figure 6B:
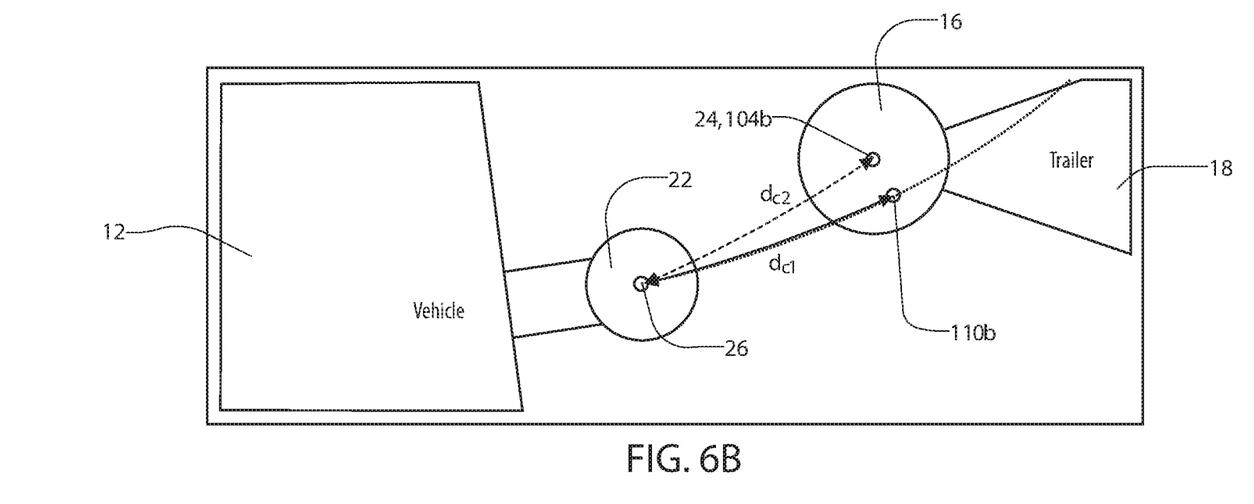
FIG. 6B is a diagram of a hitch ball of a vehicle approaching a coupler of a trailer demonstrating a second detected position of the coupler.

To clearly demonstrate the maneuvering procedure provided by the disclosure, an exemplary scenario is now discussed in reference to FIGS. 6A and 6B. In FIG. 6A, the hitch ball 22 is shown at a first distance $D_{c1}$ to coupler 16, and in FIG. 6B, the hitch ball 22 is shown at a second distance $D_{c2}$ to coupler 16. In the example demonstrated, the coupler position 24 changes from the first location 104A identified by the controller 14 in FIG. 6A to the second location 104B identified by the controller 14 in FIG. 6B. Recall that the change in the detected location of 104 of the coupler position 24 may change during operation of the path derivation routine 88 due to fluctuations in the image data or other scanning data utilized to identify the detected location 104 of the coupler position 24. From FIG. 6A to FIG. 6B, such a situation is depicted. As illustrated in FIG. 6A, the controller is shown maneuvering the vehicle 12 to a first target position 110a corresponding to the first detected location 104a, which is shown along the first steering extent 106a. However, at the second distance $D_{c2}$, the second detected location 104b is shown detected outside the first steering extent 106a such that the hitch ball 22 may not be exactly aligned with the coupler 16 along the trajectory range 102. In order to prevent operating errors, the system 10 may identify a second target position 110b that is within the trajectory range 102 to prevent an operating error.

Figure 7A:
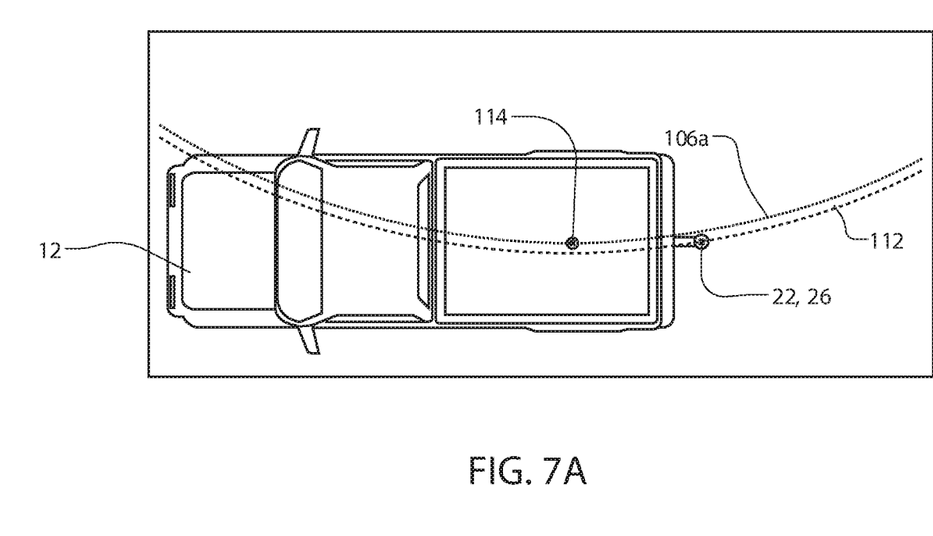
FIG. 7A is a diagram of a hitch ball of a vehicle demonstrating a hitch trajectory relative to a steering radius of the vehicle.
Figure 7B:
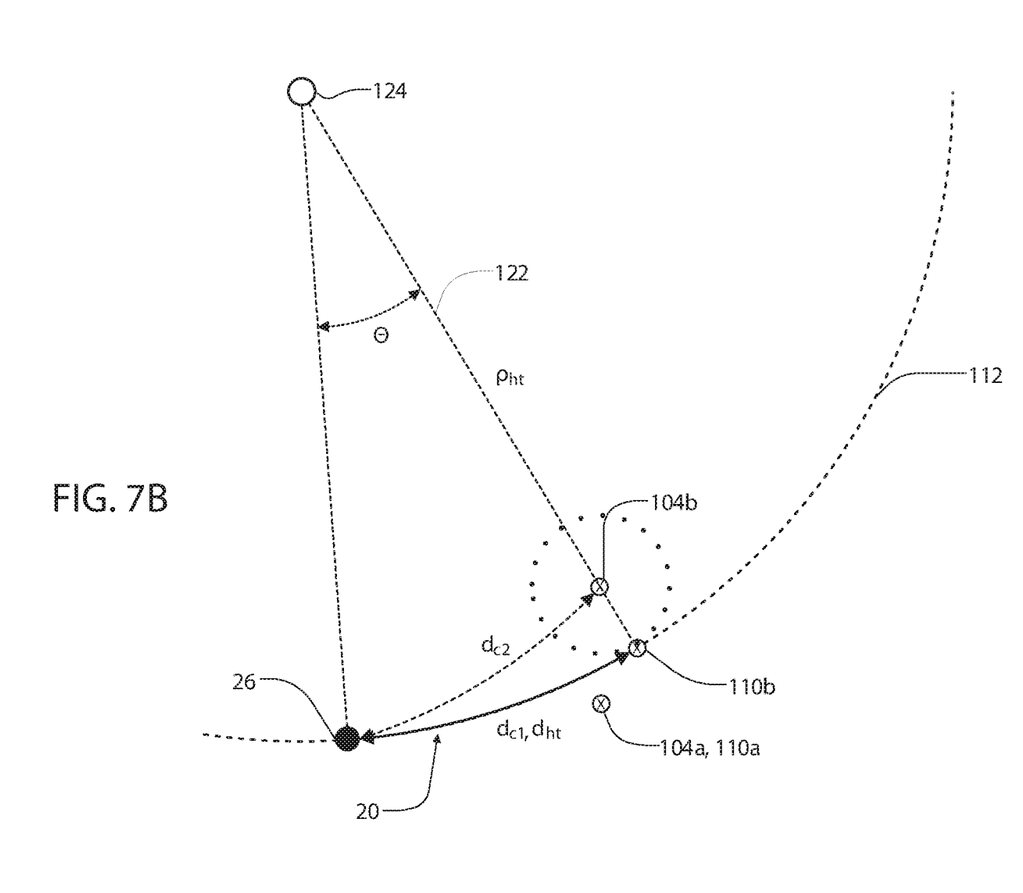
FIG. 7B is a diagram of a hitch ball demonstrating a method for defining a target position for a hitch ball proximate to a coupler of a trailer based on a limited steering range.

Referring now to FIGS. 7A and 7B, a method for defining the second target position 110b and aligning the hitch ball 22 with the second target position 110b is provided. As previously discussed, if the controller 14 identifies that the detected location 104 has changed such that it is outside the trajectory range 102, the controller 14 may identify a saturated steering scenario and control the system 10 via a saturated steering routine. The saturated steering routine may first extrapolate a hitch trajectory 112 using the current steering angle δ, which may correspond to the first steering extent 106a when the steering is saturated. As shown in FIG. 7A, the hitch trajectory 112 extends along a circle concentric with a center 114 of a rear axle on the vehicle 12. For example, the center 114 of the rear axle may correspond to the pivot point of turning for the vehicle 12 as discussed herein. In this configuration, a rear axle trajectory 116 may comprise a radius equal to the turning radius ρ of the vehicle 12. The radius $\rho_{ht}$ of the hitch trajectory 112 may be slightly larger, depending on the hitch position 26 relative to the center 114 of the rear axle.

Based on the hitch trajectory 112, the path of the hitch ball 22 may be analyzed by the controller 14 to identify the point along the hitch trajectory 112 with the closest absolute distance to the coupler 16. In this way, the controller 14 may assign the second target position 110b to the closest absolute distance to the coupler 16 along the hitch trajectory 112. Continuing from the example of FIGS. 6A and 6B, in this way, the controller 14 may respond to the change in the target of the hitch ball 22 from the first target position 110a (associated with the first detected location 104a) to the second target position 110b (associated with the second detected location 104b). Again, the change in the detected location 104 of the coupler 16 may result from variations in image data or corresponding algorithms that may be utilized by the system 10 to identify the detected location of the coupler 16.

Referring now to FIG. 7B, if the second detected location 104b of the coupler 16 is outside the trajectory range 102, the controller 14 may identify the closest absolute distance to the second detected location 104b. In order to calculate the closest distance to the second detected location within the trajectory range 102, the controller 14 may calculate a line 122 from a center 124 of the hitch trajectory 112 through the coupler position 24, which is identified in the instant example as the second detected location 104b. In this way, the controller 14 may identify the second target position 110b as the point where the line 122 intersects the hitch trajectory 112. Once the second target position 110b is calculated, the controller 14 may control the system 10 to maneuver the vehicle 12 along the path 20 to align the hitch ball 22 with the second target position 110b. In this way, the disclosure may provide for the system 10 to successfully maneuver the vehicle 12 within an alignment threshold such that the hitch ball 22 is sufficiently aligned with the coupler 16 to connect the trailer 18 to the vehicle 12.

Once the path of the vehicle 12 is calculated, the controller 14 may continue to calculate a travel distance $d_{ht}$ to the second target position 110b. The travel distance $d_{ht}$ may be calculated based on the distance along the hitch trajectory 112 as:

$$d_{ht}=\rho_{ht}\cdot\Theta \quad (3)$$

in which $\rho_{ht}$ is the radius of the hitch ball 22 along the hitch trajectory 112 and Θ is the relative angle from the current position of the hitch ball 22 to the second target position 110b. Accordingly, by maneuvering the vehicle 12 along the maximum steering angle $\delta_{max}$, the system 10 may provide for the approximate alignment of the hitch ball 22 with the coupler 16 even under circumstances where the detected location 104 of the coupler 16 changes to be located outside the trajectory range 102.

Once the distance to the second target position 110b is identified, the controller 14 may continue to identify a braking threshold. The braking threshold may correspond to a stopping distance of the vehicle 12, which may be calibrated and/or dynamically determined based on the current conditions and/or calibrated based on test data. When remaining travel distance $d_{ht}$ becomes equal to or less than the braking threshold, the system 10 may control the brake control system 62 to stop the vehicle 12. The braking threshold may be dependent on vehicle speed as a calibrate value. Once the vehicle is stopped, the system 10 may reach a standstill at the second target position 110b such that the hitch ball is approximately aligned with the coupler 16.

Figure 8:
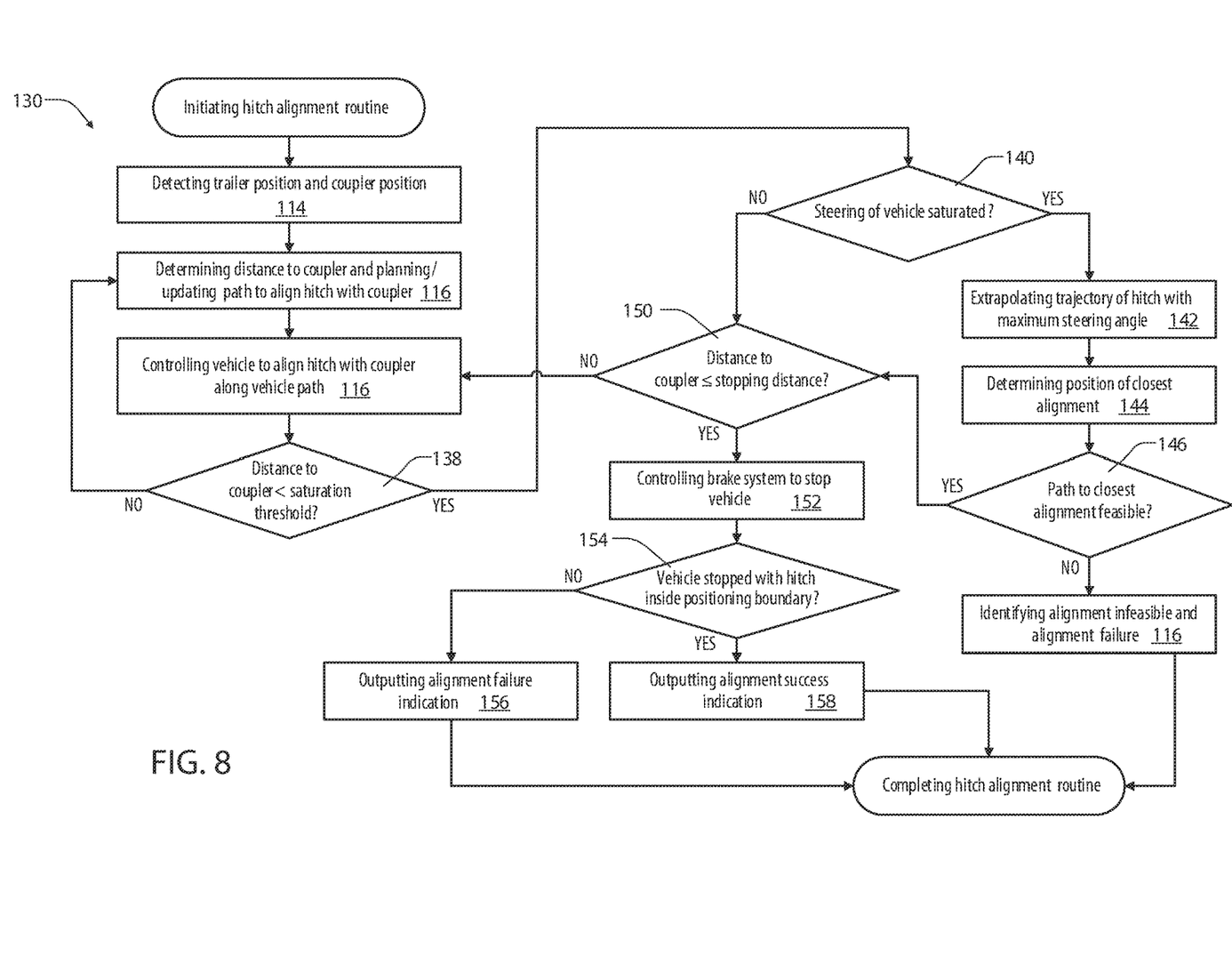
FIG. 8 is a flow chart demonstrating a method for defining a target position for a hitch ball proximate to a coupler of a trailer based on a limited steering range.

Referring now to FIG. 8, a flow chart demonstrating an alignment routine 130 for controlling the vehicle 12 to align the hitch ball 22 with the coupler 16 is shown as discussed herein. The routine 130 may begin by detecting the coupler position 24 of the coupler 16 in connection with the trailer 18 (132). Once the coupler position 24 is identified, the controller 14 may continue by determining the distance $D_c$ to the coupler 16 and the path 20 of the vehicle to align the hitch ball 22 with the coupler 16 (134). Once the path 20 and distance $D_c$ to the coupler 16 are determined, the controller 14 may control the vehicle 12 to navigate along the path 20 to the first target position 110a associated with the first detected position 104a (136). Throughout the navigation along the path 20, the controller 14 may further compare the remaining distance $D_c$ to the coupler 16 with a steering saturation threshold. (138) The steering saturation threshold may correspond to a predetermined value wherein the vehicle 12 is sufficiently close to the trailer 18 that the likely variation in the detected coupler position 104 may result in the steering of the vehicle becoming saturated such that the detected coupler position is outside the trajectory range 102. The steering saturation threshold may vary based on the specific configuration and be determined from experimental trials to identify the likely maximum distance at which steering saturation may occur.

Once the vehicle 12 is within a distance of the steering saturation threshold, the controller 14 may compare the detected coupler position 104 to the trajectory range 102 to determine if the steering of the vehicle 12 has become saturated (140). If the steering of the vehicle 12 is detected as being saturated (e.g. the detected coupler position 104 changes from the first detected coupler position 104a to the second detected coupler position 104b), the controller 14 may extrapolate the hitch trajectory 112 based on the maximum steering angle or steering extent 106 (142). Based on the hitch trajectory 112, the controller 14 may continue to determine the closest position along the hitch trajectory 112 and determine a new target position (e.g. the second target position 110b) (144). In step 146, the controller 14 may further compare the new target position (e.g. the second target position 110b) to the updated coupler position (e.g. the second detected coupler position 104b) to determine if the path to closest alignment or approximate alignment is feasible (146). For example, in step 146, the controller 14 may compare the distance of the closest alignment to an alignment threshold. If the distance is greater than the alignment threshold, the controller 14 may identify that the alignment is not possible (148).

Following step 140 if the vehicle steering is not saturated, the controller 14 may continue to step 150. Similarly, if the path to closest alignment is determined to be feasible in step 146, the controller 14 may continue to step 150. In step 150, the controller 14 may compare the distance of the coupler 16 to the target position 110 (e.g. the first target position 110a from step 140 or the second target position 110b from step 146) to a stopping distance (150). If the distance to the target position 110 is less than or equal to the stopping distance, the controller 14 may control the brake control system 62 to stop the vehicle (152). If the distance to the target position 110 is greater than the stopping distance, the controller 14 may continue to maneuver the vehicle 12 to the target position 110.

Once the vehicle 12 is stopped following step 152, the controller 14 may further compare the detected coupler position 104 to the hitch position 26 to determine if the hitch ball 22 is within a positioning boundary (154). The positioning boundary may correspond to a predetermined region around the detected coupler position 104 wherein the coupler 16 may be connected to the hitch ball 22 without unnecessary burden. Step 154 may seem redundant but recall that the detected coupler position 104 may vary and there may be errors associated with maneuvering and/or stopping the vehicle 12. If the hitch ball 22 is outside the positioning boundary, the controller 14 may output an alignment failure indication (156). If the hitch ball 22 is within the positioning boundary, the controller 14 may output an alignment success indication. Following each of steps 116, 156, and 158, the controller 14 may complete the hitch alignment routine 130.

The specific detailed steps discussed in reference to the various embodiments and methods described herein are examples provided to demonstrate some useful applications of the systems and devices disclosed by the application. It shall be understood that the disclosed systems, devices, and each of the corresponding related elements implemented to complete the various methods discussed herein are provided as exemplary illustrations of the disclosure. Accordingly, the detailed embodiments shall not be considered limiting to the scope of the disclosure.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method for controlling a vehicle comprising:
   identifying a first detected position of a trailer coupler in sensor data;
   identifying a trajectory range of a hitch of the vehicle based on a steering angle range of the vehicle;
   in response to the first detected position being outside the trajectory range, calculating a nearby position within the trajectory range with a maximum steering angle; and
   controlling a steering apparatus with a processor of a computerized maneuvering system of the vehicle, thereby maneuvering the vehicle aligning the hitch with the nearby position.

2. The method according to claim 1, further comprising:
maneuvering the vehicle to the first detected position in response to the first detected position being within the trajectory range of the hitch.

3. The method according to claim 2, further comprising:
detecting a change in the first detected position of the trailer coupler to a second detected position, wherein the second detected position is outside the trajectory range as a result of the change identified in the sensor data.

4. The method according to claim 3, wherein the change in the first detected position is detected based on a change in a vehicle position relative to the trailer coupler.

5. The method according to claim 3, wherein the change in the first detected position is detected in response to a variation in the sensor data.

6. The method according to claim 3, wherein the nearby position is calculated by identifying a minimum distance between an extent of the trajectory range of the hitch of the vehicle and the second detected position.

7. The method according to claim 3, further comprising:
identifying an alignment distance between the second detected position and the nearby position.

8. The method according to claim 7, further comprising:
comparing the alignment distance to an alignment threshold.

9. The method according to claim 8, wherein the maneuvering of the vehicle to the nearby position is controlled in response to the comparison of the alignment distance to the alignment threshold.

10. The method according to claim 8, further comprising:
in response to the alignment distance being greater than the alignment threshold, identifying an unsuccessful alignment; and
in response to the alignment distance being less than the alignment threshold, identifying a successful alignment.

11. A vehicle maneuvering system comprising:
a steering apparatus; and
a controller that:
identifies a first target of a trailer coupler in a sensor data;
compares the first target to a trajectory range of a hitch of the vehicle;
in response to the first target being outside the trajectory range, calculates a second target based on the trajectory range; and
controls the steering apparatus to align the hitch with the second target.

12. The system according to claim 11, further comprising:
a sensor that captures the sensor data, wherein the sensor comprises at least one of an image sensor, an ultrasonic sensor, and a radar sensor.

13. The system according to claim 11, wherein the trajectory range is based on a steering angle range of the steering apparatus.

14. The system according to claim 11, wherein the controller further:
aligns the hitch with the second target by controlling a powertrain control system controlling a movement of the vehicle.

15. The system according to claim 11, wherein the controller further:
in response to the first target identified within the trajectory range, controls the steering apparatus to align the hitch with the first target.

16. The system according to claim 15, wherein the controller further:
detects a change in the first target, wherein the change results in a changed first target location outside the trajectory range as identified in the sensor data.

17. The system according to claim 16, wherein the second target is calculated by identifying a minimum distance between an extent of the trajectory range of the hitch of the vehicle and the changed first target location outside the trajectory range.

18. A vehicle system, comprising:
a hitch mounted on a vehicle;
a sensor apparatus configured to capture sensor data in a region proximate to the vehicle depicting a coupler of a trailer;
a steering apparatus comprising a steering range; and
a controller that:
identifies a detected position of the coupler in the sensor data;
compares the detected position to a trajectory range of the hitch based on the steering range;
in response to the detected position outside the trajectory range, calculates an approximate alignment target based on the trajectory range; and
controls the steering apparatus and a powertrain system of the vehicle to align the hitch with the approximate alignment target.

19. The system according to claim 18, wherein the sensor apparatus comprises an imaging system including one or more cameras mounted on the vehicle; and
wherein the controller further identifies the detected position based on image data received from the imaging system depicting the coupler.

20. The system according to claim 18, wherein the approximate alignment target is calculated by identifying a minimum distance between an extent of the trajectory range of the hitch of the vehicle and the detected position.

* * * * *